Patented Jan. 13, 1953

2,625,547

UNITED STATES PATENT OFFICE 2,625,547

PROCESS OF PREPARING BENZHYDRYL AND 9-FLUORENYL TERTIARY AMINO-ALKANOATES

Elmer J. Lawson, Rensselaer County, and Aaron Addelston, Queens County, N. Y., assignors to Sterling Drug Inc., New York, N. Y., a corporation of Delaware No Drawing. Application January 13, 1950, Serial No. 138,514

7 Claims. (Cl. 260—247.2)

This invention relates to diarylmethyl (aliphatic tertiary-amino)alkanoates, to acid-addition salts thereof, and to methods of preparing the same.

We have found that compounds having the formula

RR'N—Alk—COOCHA$_2$ where RR'N is a lower aliphatic tertiary-amino radical, Alk is a lower alkylene radical, and CHA$_2$ is benzohydryl or 9-fluorenyl, are useful as pharmaceutical agents, for instance as antispasmodics. In the above formula, the lower aliphatic tertiary-amino radical designated as RR'N includes those radicals where R and R' are lower alkyl radicals, such as di(lower alkyl)-amino radicals being dimethylamino, diethylamino, methylethylamino, di-n-butylamino, di-isoamylamino, di-n-hexylamino, and the like, as well as those radicals where R and R' may be joined to form saturated N-heteromonocyclic radicals having 5–6 ring atoms, such as N-piperidino, 2-methyl-N-piperidino, 3-ethyl-N-piperidino, N-morpholino, N-pyrrolidino, 2-methyl-N-pyrrolidino, 2,5-dimethyl - N - pyrrolidino, and the like. Thus, RR'NH designates a lower aliphatic secondary amine as illustrated by diethylamine, methylethylamine, di-n-butylamine, morpholine, piperidine, 2,5-dimethylpyrrolidine, and the like. The lower alkylene radical designated as Alk is a divalent radical such as

—CH$_2$—, —CH$_2$CH$_2$—, —CH$_2$CH$_2$CH$_2$—,

—ĊH(CH$_3$), —ĊH(C$_2$H$_5$), —Ċ(C$_2$H$_5$)$_2$, —CH$_2$ĊH(CH$_3$)$_2$,

—CH$_2$CH$_2$CH$_2$—, —CH$_2$CH$_2$CH$_2$CH$_2$CH$_2$—

—CH$_2$Ċ(CH$_3$)$_2$ and the like.

The following are illustrative of the basic esters of our invention and their means of preparation:

A. Benzohydryl dimethylaminoacetate, which has the formula (CH$_3$)$_2$NCH$_2$COOCH(C$_6$H$_5$)$_2$ It is prepared by reacting benzohydryl chloroacetate with dimethylamine or by heating methyl dimethylaminoacetate with benzohydrol in a water-immiscible solvent such as toluene, separating the methanol formed by the reaction by means of a continuous separator.

B. Benzohydryl beta-diethylaminopropionate (C$_2$H$_5$)$_2$NCH$_2$CH$_2$COOCH(C$_6$H$_5$)$_2$ This ester results when benzohydrol is heated with ethyl beta-diethylaminopropionate.

C. Benzohydryl gamma-N-piperidinobutyrate

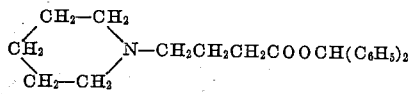

This basic ester is synthesized by treating benzohydrol with gamma-chlorobutyryl chloride to form benzohydryl gamma-chlorobutyrate which is condensed with piperidine to form the amino ester.

D. Benzohydryl beta-di-n-butylamino-alpha-methylpropionate (n—C$_4$H$_9$)$_2$NCH$_2$CH(CH$_3$)COOCH(C$_6$H$_5$)$_2$ Preparation of this compound is effected by heating benzohydrol with methyl beta-di-n-butylamino-alpha-methylpropionate.

E. 9-fluorenyl beta-(2-methyl-N-piperidino)-propionate

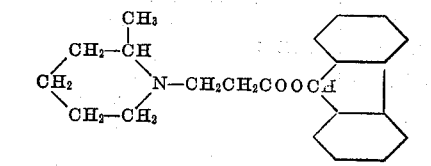

This ester is formed by heating 9-fluorenol with methyl beta-(2-methyl-N-piperidino)propionate.

F. Benzohydryl beta-N-morpholinobutyrate

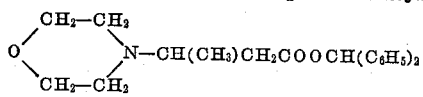

This compound results when benzohydrol is heated with ethyl beta-N-morpholinobutyrate.

G. 9-fluorenyl 2-methyl-N-pyrrolidinoacetate

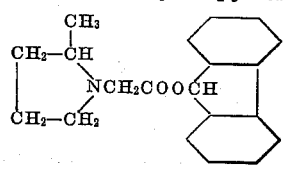

The above fluorenyl ester is prepared by reacting 9-fluorenol with chloroacetyl chloride to form 9-fluorenyl chloroacetate which is then condensed with 2-methylpyrrolidine.

The basic esters of our invention are prepared by esterifying a tertiary-aminoalkanoic acid with benzohydrol or 9-fluorenol, or stepwise, by esterifying a lower halo-alkanoic acid with benzohydrol or 9-fluorenol and reacting the ester thus formed with a secondary aliphatic amine. The esterification can be accomplished by treating the benzohydrol or the 9-fluorenol with either the free acid, or the corresponding acid halide or lower alkyl ester thereof. Thus, the basic esters of our invention are obtained by treating an (aliphatic tertiary-amino) alkanoyl halide of the formula RR′N—Alk—CO—halogen or the corresponding parent acid, where RR′N and Alk have the meanings designated hereinabove, with benzohydrol or 9-fluorenol. For example, treating beta-diethylamino-alpha, alpha-diethylpropionyl chloride or beta-diethylamino-alpha,alpha-diethylpropionic acid with 9-fluorenol yields 9-fluorenyl beta-diethylamino-alpha,alpha-diethylpropionate; the reaction using the acid halide and isolating the basic ester as the hydrochloride is shown in the following equation:

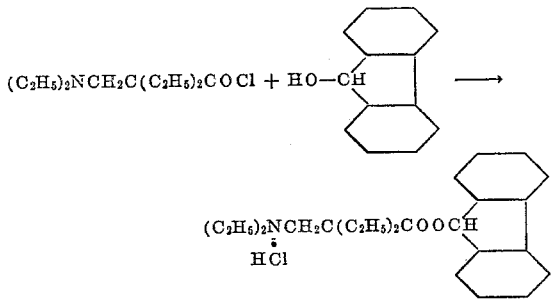

A variant is the treatment of benzohydrol or 9-fluorenol with a haloalkanoyl halide or a haloalkanoic acid to yield a benzohydryl or 9-fluorenyl haloalkanoate, which then is treated with a secondary amine of the formula, RR′NH, where RR′N has the same meaning designated above. Thus, benzohydryl beta-dimethylaminopropionate is prepared by first reacting beta-chloropropionyl chloride or beta-chloropropionic acid with benzohydrol to yield benzohydryl beta-chloropropionate which is then treated with dimethylamine. These reactions, using the acid halide in the first step, are illustrated by the following equations:

$$ClCH_2CH_2COCl + HOCH(C_6H_5)_2 \longrightarrow ClCH_2CH_2COOCH(C_6H_5)_2$$

$$\xrightarrow{\text{excess } (CH_3)_2NH}$$

$$(CH_3)_2NHCH_2CH_2COOCH(C_6H_5)_2 + (CH_3)_2NH \cdot HCl$$

The tertiary-aminoalkanoates of our invention also are formed by the ester exchange reaction which comprises reacting a lower alkyl ester of a tertiary-aminoalkanoic acid having the formula RR′N—Alk—COO—(lower alkyl) with benzohydrol or 9-fluorenol. This variant is illustrated in the preparation of benzohydryl beta-dimethylaminopropionate from methyl beta-dimethylaminopropionate and benzohydrol according to the following equation:

$$(CH_3)_2NCH_2CH_2COOCH_3 + HOCH(C_6H_5)_2 \rightarrow$$
$$(CH_3)_2NCH_2CH_2COOCH(C_6H_5)_2 + CH_3OH$$

This above ester exchange variant is carried out preferably in the presence of an alkaline catalyst such as alkali metals, e. g. sodium; alkali alkoxides, e. g. sodium ethoxide; and the like. The lower alkanol formed by the reaction is separated from the reaction mixture by means of a continuous separator. The reaction is preferably carried out by heating together the lower alkyl tertiary-aminoalkanoate and benzohydrol or 9-fluorenol in the presence of petroleum ether or benzene or toluene or other water-immiscible solvents having a boiling point relatively close to that of water, so that a mixture of water and the water-immiscible solvent distils from the reaction mixture.

Further, our basic esters are formed by treating a metal salt of a tertiary-aminoalkanoate with benzohydryl or 9-fluorenyl halide; for example, benzohydryl chloride when treated with sodium N-piperidylacetate according to the following equation yields benzohydryl N-piperidylacetate:

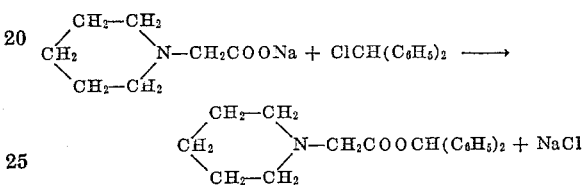

It is often convenient to isolate and use the basic esters of our invention as the water-soluble hydrochloric acid-addition salts. It is, of course, understood that other water-soluble salts, such as those derived from other non-toxic inorganic acids, including hydrobromic acid, sulfuric acid, phosphoric acid, and the like, and non-toxic organic acids, including tartaric acid, citric acid, succinic acid, and the like, will serve the same purpose and are within the scope of our invention. These salts are generally crystalline solids, and since they manifest the same therapeutic properties as the free bases they constitute a preferred form for the use of these basic esters.

The following examples further illustrate specific embodiments of the invention.

*Example 1*

*Benzohydryl beta-diethylaminopropionate hydrochloride.*—A mixture of 9.2 g. of benzohydrol, 8.0 g. of methyl beta-diethylaminopropionate, and 0.01 g. of sodium metal in about 100 ml. of a petroleum ether fraction comprising mixed octanes was refluxed for five hours in a flask adapted with a water separator. Most of the petroleum ether was then removed by distillation; the residue was cooled and dissolved in ether. The ether solution was washed well with water, dried over anhydrous sodium sulfate, and filtered. To the clear and colorless filtrate was added an ethanolic solution of hydrogen chloride, whereupon there was precipitated a large amount of white crystalline material that was filtered and washed several times with ether. This product, weighing about 11 g. and melting at 165° C. after softening at 163° C., is benzohydryl beta-diethylaminopropionate hydrochloride of the formula

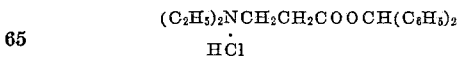

The above compound, benzohydryl beta-diethylaminopropionate hydrochloride, is also formed when the procedure illustrated by Examples 3 and 7 is followed using benzohydryl beta-chloropropionate and diethylamine as the reactants.

*Example 2*

The following example is representative of our 9-fluorenyl di(lower alkyl) aminoalkanoates.

*9-fluorenyl beta-diethylaminopropionate hydrochloride.*—A mixture of 19.7 g. of 9-fluorenol, 25 g. of methyl beta-diethylaminopropionate, and 0.01 g. of sodium metal in about 200 ml. of a petroleum ether fraction comprising mixed octanes was refluxed for seven hours in a flask adapted with a water separator. After removal of the petroleum ether plus some of the excess methyl beta-diethylaminopropionate, the residue was treated with enough of a mixture of ether and benzene to effect dissolution, and the solution was filtered. The filtrate was extracted with dilute hydrochloric acid; the acidic extract was made alkaline with dilute sodium hydroxide solution and extracted with ether; and the ether extract was dried over anhydrous sodium sulfate. After removal of the ether by distillation, the main fraction was distilled at 173–80° C. at 3.5 to 4.0 mm. The distillate was dissolved in dry ether, and the ether solution was treated with ethanol saturated with hydrogen chloride whereupon there separated a precipitate which was filtered, washed with ether, and then dried in vacuo at 100° C. This product, 9-fluorenyl beta-diethylaminopropionate hydrochloride, melts at 167–9° C. and has the formula

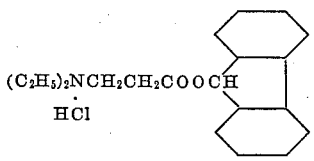

The above compound, 9-fluorenyl beta-diethylaminopropionate hydrochloride, results when the procedure illustrated by Examples 3 and 7 is followed using as the reactants 9-fluorenyl beta-chloropropionate and diethylamine.

*Example 3*

*Benzohydryl diethylaminoacetate hydrochloride.*—A solution of 10 g. of benzohydryl chloroacetate and 5.6 g. of diethylamine in 20 ml. of dry benzene was refluxed on a steam bath for two hours. The reaction mixture was cooled; the precipitated diethylamine hydrochloride was filtered off; and the filtrate was washed with water and extracted with dilute hydrochloric acid. The acidic extract was made alkaline with dilute sodium hydroxide solution and extracted with ether. After the ether extract had been dried over anhydrous sodium sulfate, dry alcoholic hydrogen chloride was added whereupon there precipitated an oil, which, upon trituration, solidified. This solid, which analyzed satisfactorily for benzohydryl diethylaminoacetate hydrochloride, melts at 141–2° C. and has the formula

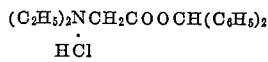

The above starting material, benzohydryl chloroacetate, which has a boiling range of 147–153° C. at less than 1 mm., was prepared readily by treating benzohydrol with chloroacetyl chloride.

*Example 4*

*Benzohydryl beta-N-piperidinopropionate hydrochloride.*—A mixture of 10 g. of benzohydrol, 10 g. of ethyl beta-N-piperidinopropionate, and about 0.01 g. of sodium in about 100 ml. of a petroleum ether fraction comprising mixed octanes was refluxed for about four hours in a flask adapted with a water separator. The cooled reaction mixture was washed with an equal volume of water and then extracted with an aqueous solution of 10% hydrochloric acid. At this point in the preparation, a considerable quantity of white solid separated in both layers. This solid, which melts at 194–7° C., was found to be the desired product, benzohydryl beta-N-piperidinopropionate hydrochloride of the formula

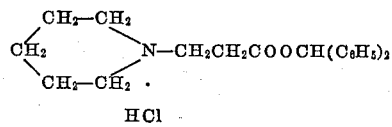

More of this product was obtained by working up of the acidic layer as described in Examples 2 and 3.

The corresponding pyrrolidyl ester, benzohydryl beta - (N - pyrrolidino) - propionate hydrochloride, having the formula

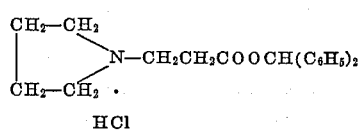

is formed when the foregoing procedure is followed using ethyl beta-(N-pyrrolidino) propionate in place of ethyl beta-(N-piperidino) propionate.

*Example 5*

*Benzohydryl beta-N-morpholinopropionate hydrochloride.*—This preparation was run like Example 4, but using 10 g. of ethyl beta-(N-morpholino) propionate instead of the corresponding ethyl beta-(N-piperidino) propionate. The reflux time was about three hours. The product, benzohydryl beta-(N-morpholino) propionate hydrochloride, melts about 184–6° C. and has the formula

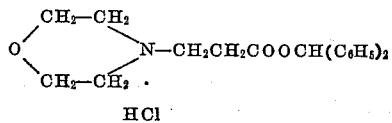

*Example 6*

*9-fluorenyl beta-(2 - methyl - N - piperidino) - propionate hydrochloride.*—A solution of 3.0 g. of 9-fluorenyl beta-chloropropionate and 2.2 g. of 2-methylpiperidine in a mixture of about 40 ml. of absolute ether and a few ml. of absolute ethanol was refluxed for 5 hours, and then allowed to cool and stand overnight. The precipitated 2-methylpiperidine hydrochloride was collected by filtration, and the filtrate was washed successively with water and dilute sodium hydroxide solution, and then dried over anhydrous sodium sulfate. After removal of the solvent by distillation in vacuo, toluene was added to the residue and removed by distillation in vacuo. The residue was treated with absolute ether, the mixture filtered, and the resulting filtrate treated with alcoholic hydrogen chloride to yield a gummy, flocculent, cream colored precipitate that soon changed into an oil. This oily material was treated with a small quantity of methanol, the solution filtered, and the filtrate treated with ether and chilled in ice. The gummy precipitate that separated was triturated, yielding a solid, which was filtered, washed with ether and dried. This solid, which sinters at about 100° C. with decomposition, is 9-fluorenyl beta-(2-methyl-N-piperidino)propionate hydrochloride of the formula

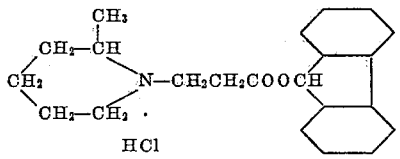

The above starting material, 9-fluorenyl beta-chloropropionate, which melts at about 68–9° C., was prepared readily by treating 9-fluorenol with beta-chloropropionyl chloride.

The above basic ester, 9-fluorenyl beta-(2-methyl-N-piperidino)propionate, is also formed from 9-fluorenol and methyl beta-(2-methyl-N-piperidino)propionate according to the procedure described in Example 2.

The related 2-methyl-N-pyrrolidino homolog of the above ester is prepared according to Example 7 using 2-methylpyrrolidine in place of 2-methylpiperidine. The resulting ester is 9-fluorenyl beta - (2 - methyl - N - pyrrolidino) - propionate hydrochloride having the formula

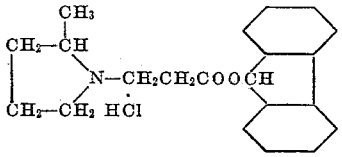

We claim:

1. The process of preparing a basic ester, which has the formula

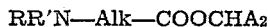

wherein R and R' are lower alkyl radicals which may be joined together to form saturated N-heteromonocyclic radicals having 5–6 ring atoms, Alk is a lower alkylene radical and $CHA_2$ is a member of the group consisting of benzohydryl and 9-fluorenyl, which comprises heating a lower alkyl ester having the formula RR'N—Alk—COO—(lower alkyl)

with a member of the group consisting of benzohydrol and 9-fluorenol.

2. The process of preparing a basic ester, which has the formula

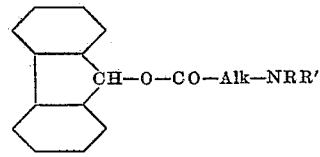

wherein Alk is a lower alkylene radical and R and R' are lower alkyl radicals, which comprises heating a lower alkyl ester having the formula (lower alkyl)—O—CO—Alk-NRR' with 9-fluorenol.

3. The process of preparing a basic ester, which has the formula $(C_6H_5)_2CH$—O—CO—Alk—NRR' wherein Alk is a lower alklene radical and R and R' are lower alkyl radicals, which comprises heating a lower alkyl ester having the formula (lower alkyl)—O—CO—Alk—NRR' with benzohydrol.

4. The process of preparing benzohydryl beta-diethylaminopropionate which comprises heating a lower alkyl beta-diethylaminopropionate with benzohydrol.

5. The process of preparing 9-fluorenyl beta-diethylaminopropionate which comprises heating a lower alkyl beta-diethylaminopropionate with 9-fluorenol.

6. The process of preparing benzohydryl beta-N-piperidinopropionate which comprises heating a lower alkyl beta-N-piperidinopropionate with benzohydrol.

7. The process of preparing benzohydryl beta-N-morpholinopropionate which comprises heating a lower alkyl beta-N-morpholinopropionate with benzohydrol.

ELMER J. LAWSON.
AARON ADDELSTON.

No references cited.